United States Patent
Wittenburg et al.

(10) Patent No.: US 7,408,850 B2
(45) Date of Patent: Aug. 5, 2008

(54) METHOD FOR DECODING DATA RECEIVED FROM A DATA SOURCE USING HARDWARE CONFIGURATION DATA RECEIVED FROM THE SAME DATA SOURCE

(75) Inventors: Jens Peter Wittenburg, Isernhagen (DE); Heinz-Werner Keesen, Hannover (DE); Herbert Schütze, Celle (DE)

(73) Assignee: Thomson Licensing, Boulogne-Billancourt (FR)

( * ) Notice: Subject to any disclaimer, the term of this patent is extended or adjusted under 35 U.S.C. 154(b) by 645 days.

(21) Appl. No.: 10/827,971

(22) Filed: Apr. 20, 2004

(65) Prior Publication Data

US 2004/0215839 A1 Oct. 28, 2004

(30) Foreign Application Priority Data

Apr. 22, 2003 (EP) .................................. 03009157

(51) Int. Cl.
*G11B 7/00* (2006.01)
(52) U.S. Cl. ................. 369/47.1; 369/59.23; 369/59.27
(58) Field of Classification Search ................ 369/47.1, 369/47.27, 44.26, 275.3, 47.19, 59.21, 59.23, 369/59.25, 59.27
See application file for complete search history.

(56) References Cited

U.S. PATENT DOCUMENTS 5,996,030 A * 11/1999 Ofer ............................ 710/19
6,378,010 B1 4/2002 Burks ........................... 710/68
2002/0031166 A1 3/2002 Subramanian et al. ...... 375/130

FOREIGN PATENT DOCUMENTS

EP 1168883 A2 1/2002

* cited by examiner

*Primary Examiner*—Nabil Hindi
(74) *Attorney, Agent, or Firm*—Joseph J. Laks; Paul P. Kiel; Guy H. Eriksen

(57) ABSTRACT

Today the storage of audiovisual (AV) data on storage media employs standardized coding schemes, e.g. MPEG-2. End user devices for AV presentation, like disc players, contain dedicated decoders implemented in hardware, which are able to decode data streams complying with the respective standard. The efficiency of this decoding methodology relies on the standardization of appropriate coding schemes. Proprietary coding schemes may be more efficient by being adapted to the content, or may be used for content protection or optional features. Using reconfigurable decoder hardware, storing the configuration data for the actual decoder on the same storage medium as the AV data, and downloading the data to configure the player can be used to implement proprietary coding schemes. Such schemes require appropriate player hardware, suitable to execute a downloaded decoder under real-time conditions, and a standardized format to store the decoder configuration data.

12 Claims, 1 Drawing Sheet

METHOD FOR DECODING DATA RECEIVED FROM A DATA SOURCE USING HARDWARE CONFIGURATION DATA RECEIVED FROM THE SAME DATA SOURCE

This application claims the benefit under 35 U.S.C. §119(a) of European Patent Application No. 03009157.3, filed Apr. 22, 2003.

FIELD OF THE INVENTION

This invention relates to a method for decoding data read from a data source, e.g. a storage medium, wherein reconfigurable hardware is used.

BACKGROUND OF THE INVENTION

Hardware architectures dedicated to a special purpose may be implemented as reconfigurable devices, or otherwise as non-reconfigurable devices such as Application Specific Integrated Circuits (ASICs). Reconfigurable devices are commonly defined as devices whose computing architecture is defined after manufacturing, and can usually be redefined. Examples are Field Programmable Gate Arrays (FPGAs), which provide full flexibility in terms of hardware (HW). However, various kinds of reconfigurable architectures differing from typical FPGAs but fulfilling the general definition have been developed or are under development. Though less efficient than ASICs, such reconfigurable architectures allow the implementation of arbitrary logic functions.

Moreover, also general-purpose hardware may have functions that are adoptable by programmable parameters, e.g. a digital filter may be implemented whose coefficients are programmable, or software (SW), whether interpreted or compiled programming languages or assembly code, may be executed on general-purpose microprocessor or digital signal processor architectures. These examples are considered as software reconfiguration.

However, recently proposed video coding schemes indicate that today's general-purpose architectures and Digital Signal Processors (DSPs) do not offer the performance required for real-time decoding, especially when it comes to high-definition video. Furthermore they are expensive and power consuming.

Further it is known that storage of audiovisual (AV) data on storage media, using e.g. Digital Versatile Disc (DVD) or hard disk in a Digital Video Recorder (DVR), relies on the standardization of the employed coding scheme, e.g. MPEG-2 or MPEG-4. Hence, end user devices, like e.g. disc players, employ dedicated decoders that are usually implemented as hardware within ASICs. The decoders are able to decode data streams that are compliant with the respective standardized format, and usually give no or little possibilities for variation of the decoding. Therefore, such storage media and the decoding devices heavily rely on the standardization of appropriate coding schemes that can provide the required efficiency.

SUMMARY OF THE INVENTION

The problem to be solved by the invention is to provide more flexible devices for decoding AV data, and thus allow usage of arbitrary encoding schemes.

According to the invention, a data source that provides AV content may also provide HW and SW configuration data representing the actual decoder that is suitable to decode the AV content. The data source may be a storage medium, e.g. optical disc, or a broadcast receiver. The decoder configuration data may be read e.g. as a preamble to the AV content, and can be downloaded to the player's HW at execution time, or shortly before execution time. Therefore the player may also contain means to store these data for later usage, e.g. flash memory. Further, the configuration data may also be encoded, and may require standard decoding before being utilized.

The target hardware to execute the decoder function is a reconfigurable architecture. Typically, the downloadable decoder consists of a combination of software and hardware definition data. The format of the decoder configuration data may be standardized to enable cooperation of media and player manufacturers.

Advantageously, with the inventive method it is possible to implement proprietary decoders, and use proprietary coding schemes for encoding the AV data. These proprietary coding schemes have many advantages, such as e.g. high efficiency by adaptation to AV content, know-how protection of coding methodology or content protection by conditional access. Reproduction of such proprietarily coded AV data requires appropriate hardware, suitable to execute a downloaded decoder under real-time conditions.

Compared to general-purpose architectures, reconfigurable architectures can offer a more flexible layer for specification of downloadable decoders. Some reconfigurable architectures currently under development will probably offer the required performance and cost efficiency.

Advantageous embodiments of the invention are disclosed in the dependent claims, the following description and the figure.

BRIEF DESCRIPTION OF THE DRAWING

Exemplary embodiments of the invention are described with reference to the accompanying drawing, which shows in FIG. 1 a reproduction device for AV data stored on an optical disc, with a reconfigurable computing unit that may receive its configuration data from the same optical disc.

DETAILED DESCRIPTION OF PREFERRED EMBODIMENTS

Figure 1:
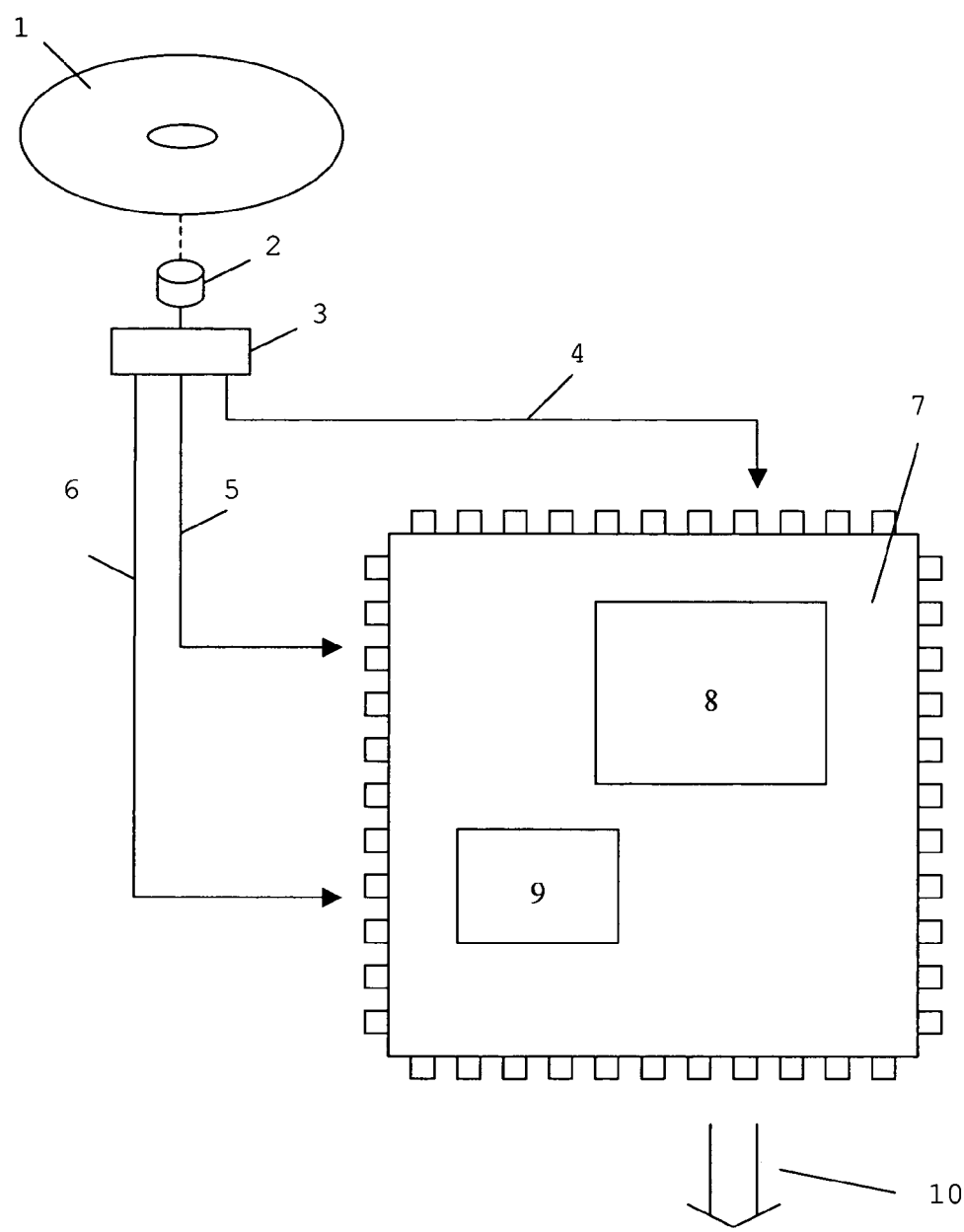

Reconfigurable architectures allow the implementation of arbitrary logic functions, covering a wide range of cost, complexity and performance. Hence, the invention is based on the idea that these reconfigurable architectures may offer the required processing power for decoders according to recent and future multimedia coding schemes at a reasonable cost level, being cheaper than high performance general purpose processors or high performance DSPs. A reconfigurable architecture for multimedia decoding will include programmable HW, but probably also dedicated HW as well as SW programmable units, like reduced instruction set computers (RISC) or other processors, e.g. array processors. Hence, the implementation of a multimedia decoder on a reconfigurable architecture may require two data streams: A configuration data stream for the reconfigurable HW, and a SW program. However, degradations are possible to just HW configuration stream or just SW program. A further increase of efficiency is possible if the decode platform also allows dynamic reconfiguration during runtime.

FIG. 1 shows an example of such a multimedia decoder. AV data and configuration data are stored on an optical disc 1, e.g. DVD, in different files or other storage units, e.g. packets. The data are read by a pick-up 2, and sorted 3 according to their data type, which can be detected e.g. by the file name, packet header or data format. The read data types comprise AV presentation data 4, hardware configuration data 5 and software configuration data 6. The hardware configuration data 5 are used to configure a reconfigurable computing unit 8 within a decoder chip 7. The software configuration data 6 may contain parameters for programming the reconfigurable computing unit 8 or an embedded processor 9, e.g. a RISC processor. The embedded processor 9 may be used e.g. for standard tasks while the reconfigurable computing unit 8 is used for implementation of a decoder which performs a specific decoding scheme, in order to decode the encoded AV data stream 4. The decoded AV data 10 can be used for further processing, e.g. can be sent to a presentation unit, a rendering device or the like. An advanced implementation of the chip 7 containing the flexible decoder HW 8 may also perform rendering, or other tasks related to the further processing of AV data 4.

According to the invention, both data streams, the hardware configuration data 5 and the software program 6, are stored on a storage device 1 together with the AV content data 4.

If both data streams have standardized formats, the AV content can be coded in any format that allows real-time implementation of the respective decoder on the provided reconfigurable hardware and the embedded processor. Minimum resources to be provided by the reconfigurable device may be standardized as well.

Advantageously, the proposed method for downloading HW/SW configuration data for a decoder is not limited to storage media. The general idea can be applied whenever hardware decoders are used for decoding received encoded data, e.g. also for broadcast or satellite transmission. In this case HW and SW configuration data may be transmitted in certain intervals, or initially before transmission of AV data.

In one embodiment of the invention, configuration data for the downloadable AV decoders are stored as preamble to content encoded with the respective encoder. When a player reads the content, it may detect the configuration data, use them to configure hardware and software for the decoder and start decoding of the AV data. The time required for decoder configuration will probably not exceed few seconds, and may be used for other purposes, e.g. a menu may be displayed which requires no decoder. Typically the amount of configuration data 5,6 is much less than the amount of AV data 4.

Another advantage of the current invention is that the specification layer for standardization of decoders may be changed. This allows employment of proprietary coding technology. In contrast to just software programmable architectures, reconfigurable hardware may provide better efficiency, higher flexibility, lower costs, reduced power consumption etc.

In one embodiment of the invention the described method to provide decoder configuration data may be used for optional features representing additional services, thus enhancing a standard decoder or defining an additional decoder. E.g. a storage medium may contain conventionally coded standard AV data and additional data, comprising presentation data that are encoded with a proprietary coder, and configuration data for the respective proprietary decoder. Thus, only a player that contains a HW configurable decoder may access the additional data, and thus access an additional service.

In another embodiment of the invention it is possible to reconfigure the hardware decoder during a presentation of AV data. This can be achieved by reading more AV data from the storage medium than currently needed, decoding them and buffering the decoded data during the presentation. While the decoded buffered data are presented, there is time for reading decoder reconfiguration data and reconfiguring the decoders HW or SW. Then the other AV data requiring the reconfigured decoder can be read and decoded, and then buffered. If previously enough decoded data have been buffered, the presentation may continue seamlessly. Thus it is possible to update a decoder at any time, or change the coding scheme within an encoded data stream, e.g. for adaptive coding for optimized data compression. Another possibility is that the SW decoder may take over decoding, probably with lower performance, while the HW decoder is reconfigured.

The inventive method can be used for decoding or processing any kind of data stored on a storage medium, preferably a removable storage medium, when extensive computations must be performed with these data, and thus a HW-implemented decoder is superior to a pure software decoder. Moreover, the inventive method can also be used for decoding or processing data received from any data source, e.g. broadcast. In this case, the broadcast transmitter may also send HW configuration data for a decoder. This may allow better adaptation of decoders to contents, or proprietary encryption of contents, being usable in particular for implementation of pay-TV. Finally, the AV data and related decoder configuration data may also be downloaded from an Internet domain. The inventive decoder may be utilized such that encoded AV presentation data and HW/SW configuration data required to decode the AV presentation data are stored on the same Internet domain, and can be downloaded. This can be used for implementing a proprietary coding scheme, e.g. for optimized AV data compression.

An exemplary application is a set top box suitable to decode AV data received from a broadcast transmitter, e.g. terrestrial, or via cable or satellite, for display on a television set or similar. Among other things, such set top box may contain a reconfigurable device and a SW programmable device, e.g. an embedded RISC processor or DSP. To employ downloadable decoders, the broadcast station transmits e.g. three different data streams, namely a data stream for HW configuration, another data stream being an executable SW program, and the content data itself. If the decoder is implemented using either only reconfigurable HW or only software, the respective unused configuration data stream may be omitted. Anyway, using pure HW decoders is usually inefficient, and using pure SW decoders usually does not provide sufficient performance. Common broadcast schemes allow transmission of arbitrary additional data streams, without disturbing the critical real time content data streams, e.g. by time division multiplexing. This can be used for transmitting configuration data according to the invention. The configuration data streams will usually be transmitted prior to the AV data stream. This transmission could be either directly before each content transmission, or periodically in regular time intervals, e.g. once each hour or once a day.

The set top box may identify each data stream e.g. by identification of individual header data transmitted in conjunction with each data stream. The HW configuration data stream is used for configuration of a reconfigurable device within the set top box. The SW program is then used to program one or more processors, which may either be implemented on the integrated circuit (IC) chip that contains the reconfigurable HW, or as a separate device. The configured HW in combination with the SW defines an AV decoder with real-time capability, which could after its configuration decode respective content data under real-time constraints. Such decoder can employ the advantages of a proprietary coding scheme, as mentioned above. The formats of the HW configuration data stream and/or the SW data stream are suitable subjects to standardization.

Typical target applications are e.g. audio and/or video data, preferably entertainment or informative data, which are stored on optical discs and may be decoded using specialized hardware, e.g. due to content protection or high calculation effort.

What is claimed is:

1. A method for decoding first data using second data, the first data being audio and/or video data read from a first data source and comprising a first and a second portion, and the second data containing decoding information for said first data, wherein
the second data are also read from said first data source; and
the decoding information contained in said second data comprises hardware configuration data being suitable for configuring reconfigurable logic, wherein the second data comprise a first and a second portion, the first portion of the second data comprising first configuration data for decoding the first portion of the first data, and the second portion of the second data comprising second configuration data being hardware configuration data for decoding the second portion of the first data using reconfigurable logic.

2. Method according to claim 1, wherein the first portion of the second data comprises hardware configuration data for decoding the first portion of the first data using reconfigurable logic.

3. Method according to claim 1, wherein said decoding information contained in said second data enables an improved decoding of said first data compared to a decoding without said second data.

4. Method according to claim 1, wherein the first data contain conventionally coded data and additional data, and wherein the second data comprise decoding information for the additional data.

5. Method for decoding and presenting first data, the first data being read from a removable storage medium and comprising a first and a second portion, using second data, the second data containing hardware configuration data being decoding information for said first data and comprising a first and a second portion, the method including the steps of
retrieving from the medium the first portion of the second data;
configuring reconfigurable logic using said first portion of the second data;
retrieving from the medium the first portion of the first data;
decoding the first portion of the first data using said reconfigurable logic, buffering and presenting the decoded first portion of the first data;
retrieving from the medium the second portion of the second data;
configuring the reconfigurable logic using said second portion of the second data;
retrieving from the medium the second portion of the first data; and
decoding the second portion of the first data using said reconfigurable logic and buffering the decoded second portion of the first data while said decoded first portion of the first data is buffered and/or presented.

6. Decoder for decoding first data, comprising
means for reading the first data and second data from a first data source, wherein the first data comprises a first and a second portion of audio and/or video data and the second data comprises a first and a second portion of configuration data, the second portion of configuration data comprising hardware configuration data;
a portion of reconfigurable logic;
means for decoding the first portion of the first data using the first portion of the second data;
means for buffering and/or presenting the decoded first portion of the first data;
means for configuring the reconfigurable logic by the second portion of said second data; and
means for decoding the second portion of the first data using the reconfigurable logic configured by said second portion of the second data.

7. Decoder according to claim 6, wherein the first data source is an optical disc.

8. Decoder according to claim 6, wherein the first data contain conventionally coded data and additional data, and wherein the second data comprise decoding information only for the additional data.

9. Storage medium containing first and second data, the first data being encoded audio and/or video data and comprising a first and a second portion, wherein
the second data contains decoding information for the first data;
the decoding information contained in said second data comprises hardware configuration data suitable for configuration of reconfigurable logic, within an integrated circuit chip wherein the second data comprise a first and a second portion, the first portion of the second data comprising first configuration data for decoding the first portion of the first data, and the second portion of the second data comprising second configuration data being hardware configuration data for decoding the second portion of the first data using reconfigurable logic;
the first portion of the second data comprises hardware configuration data for decoding the first portion of the first data using reconfigurable logic;
the first data contains conventionally coded data and additional data, and wherein the second data comprise decoding information for the additional data;
the decoding information contained in said second data enables an improved decoding of said first data compared to a decoding without said second data; and
the reconfigurable logic is reconfigured while said first portion of the first data is being buffered or presented.

10. Method according to claim 1, wherein the reconfigurable logic is reconfigured while said first portion of the first data is being buffered or presented.

11. Decoder according to claim 6, wherein the means for decoding the first portion of the first data using the first portion of the second data comprises reconfigurable logic, the decoder further comprising means for configuring the reconfigurable logic by the first portion of said second data.

12. Decoder according to claim 6, wherein the means for configuring the reconfigurable logic by the second portion of said second data performs the configuring while said first portion of the first data is being buffered or presented.

* * * * *